United States Patent [19]
Dolsey et al.

[11] Patent Number: 6,120,888
[45] Date of Patent: Sep. 19, 2000

[54] INK JET PRINTABLE, SATURATED HYDROENTANGLED CELLULOSIC SUBSTRATE

[75] Inventors: Russell Lynn Dolsey, Roswell; John Patrick Allison, Marietta, both of Ga.

[73] Assignee: Kimberly-Clark Worldwide, Inc., Neenah, Wis.

[21] Appl. No.: 08/885,653

[22] Filed: Jun. 30, 1997

[51] Int. Cl.⁷ .................................................. D03D 13/00
[52] U.S. Cl. ........................ 428/222; 428/299; 428/301; 428/297; 428/340; 428/342; 428/326; 428/219
[58] Field of Search ................................. 442/384, 153, 442/385, 387, 408, 421, 422; 428/284, 286, 287, 288, 296, 299, 301, 283, 325, 326, 913, 224, 219, 222, 297, 340, 342; 427/392; 28/112, 104, 105

[56] References Cited

U.S. PATENT DOCUMENTS

| | | | |
|---|---|---|---|
| D. 239,566 | 4/1976 | Vogt | D59/2 R |
| D. 264,512 | 5/1982 | Rogers | D59/2 B |
| 3,016,599 | 1/1962 | Perry, Jr. | 28/78 |
| 3,341,394 | 9/1967 | Kinney | 161/72 |
| 3,404,647 | 10/1968 | Pohl et al. | 112/405 |
| 3,485,706 | 12/1969 | Evans | 161/72 |
| 3,486,168 | 12/1969 | Evans et al. | 161/169 |
| 3,649,400 | 3/1972 | Sawaki et al. | 156/148 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,855,046 | 12/1974 | Hansen et al. | 161/150 |
| 3,947,983 | 4/1976 | Brunette | 40/27 |
| 3,978,185 | 8/1976 | Butin et al. | 264/93 |
| 3,988,343 | 10/1976 | Lilyquist | 260/29.6 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,144,370 | 3/1979 | Boulton | 428/233 |
| 4,183,431 | 1/1980 | Schmidt et al. | 206/63.3 |
| 4,196,245 | 4/1980 | Kitson et al. | 428/198 |
| 4,340,563 | 7/1982 | Appel et al. | 264/518 |
| 4,392,315 | 7/1983 | Irving et al. | 40/27 |
| 4,405,297 | 9/1983 | Appel et al. | 425/72 |
| 4,434,204 | 2/1984 | Hartman et al. | 428/198 |
| 4,493,868 | 1/1985 | Meitner | 428/171 |
| 4,554,207 | 11/1985 | Lee | 428/288 |
| 4,612,226 | 9/1986 | Kennette et al. | 428/134 |
| 4,627,811 | 12/1986 | Greiser et al. | 425/72 S |
| 4,644,045 | 2/1987 | Fowells | 526/348 |
| 4,663,220 | 5/1987 | Wisneski et al. | 428/22 |
| 4,717,621 | 1/1988 | So et al. | 428/349 |
| 4,761,326 | 8/1988 | Barnes et al. | 428/219 |
| 4,781,966 | 11/1988 | Taylor | 428/152 |
| 4,808,467 | 2/1989 | Suskind et al. | 428/284 |
| 4,879,170 | 11/1989 | Radwanski et al. | 428/233 |
| 4,931,355 | 6/1990 | Radwanski et al. | 428/283 |
| 4,939,016 | 7/1990 | Radwanski et al. | 428/152 |
| 4,950,531 | 8/1990 | Radwanski et al. | 428/284 |
| 4,970,104 | 11/1990 | Radwanski et al. | 428/198 |
| 5,009,747 | 4/1991 | Viazmensky et al. | 162/115 |
| 5,031,775 | 7/1991 | Kane | 206/571 |
| 5,106,457 | 4/1992 | Manning | 162/115 |
| 5,108,820 | 4/1992 | Kaneko et al. | 428/198 |
| 5,137,600 | 8/1992 | Barnes et al. | 162/115 |
| 5,151,320 | 9/1992 | Homonoff et al. | 428/284 |
| 5,217,772 | 6/1993 | Brown et al. | 428/40 |
| 5,223,095 | 6/1993 | Kinsley, Jr. | 162/146 |
| 5,223,329 | 6/1993 | Amann | 428/198 |
| 5,284,703 | 2/1994 | Everhart et al. | 428/283 |
| 5,290,628 | 3/1994 | Lim et al. | 428/299 |
| 5,328,759 | 7/1994 | McCormack et al. | 428/283 |
| 5,336,552 | 8/1994 | Strack et al. | 428/224 |

(List continued on next page.)

FOREIGN PATENT DOCUMENTS

| | | |
|---|---|---|
| 522791 | 3/1956 | Canada . |
| 0 586 924 | 3/1994 | European Pat. Off. . |
| 92/08834 | 5/1992 | WIPO . |

OTHER PUBLICATIONS

Abstract of JP 05–85069 dated Apr. 6, 1993.
Abstract of JP 08–258417 dated Oct. 8, 1996.
Abstract of JP 08–232170 dated Sep. 10, 1996.
Abstract of JP 08–50452 dated Feb. 20, 1996.
Abstract of JP 07–119073 dated May 9, 1995.
Abstract of JP 5–96669 dated Apr. 20, 1993 (with attached Japanese text patent copy).
"Superfine Thermoplastic Fibers" by V. A. Wente, Industrial and Engineering Chemistry, vol. 48, No. 8, pp. 1342–1346 (1956).
"Manufacture of Superfine Organic Fibers", by V. A. Wente et al., Navy Research Laboratory, Washington, D.C., NRL Report 4364 (111437), May 25, 1994, US Dept. of Commerce, Office of Technical Services.
"Melt Blowing—A One–Step Web Process for New Nonwoven Products" by R. R. Butin et al., Journal of the Technical Association of the Pulp and Paper Industry, vol. 56, No. 4, pp. 74–77 (1973).

Primary Examiner—Merrick Dixon
Attorney, Agent, or Firm—Nelson Mullins Riley & Scarborough

[57] ABSTRACT

An ink jet printable, saturated hydroentangled fibrous web which includes fibers and a saturant. The fibers include from about 20 to 100 percent by weight, based on the total weight of the fibers, of cellulosic fibers. From 0 to about 70 percent by weight of the fibers may be mercerized cellulosic fibers. From about 80 to 0 percent by weight of the fibers, based on the total weight of the fibers, may be synthetic polymer fibers. The saturant is present in the saturated fibrous web at a level of from about 40 to about 85 percent, based on the dry weight of the fibers. When synthetic polymer fibers are present in the web, the saturant may be adapted to wet synthetic polymer fibers. A second layer which includes a bonded nonwoven web also may be present. Also provided are methods of preparing the ink jet printable, saturated hydroentangled fibrous web.

33 Claims, No Drawings

U.S. PATENT DOCUMENTS

| | | | |
|---|---|---|---|
| 5,389,202 | 2/1995 | Everhart et al. | 162/103 |
| 5,393,599 | 2/1995 | Quantrille et al. | 428/284 |
| 5,405,650 | 4/1995 | Boulanger et al. | 427/261 |
| 5,418,022 | 5/1995 | Anderson et al. | 428/35.2 |
| 5,431,991 | 7/1995 | Quantrille et al. | 428/109 |
| 5,459,912 | 10/1995 | Oathout | 28/105 |
| 5,475,903 | 12/1995 | Collins | 28/104 |
| 5,494,745 | 2/1996 | Vander Velden et al. | 428/354 |
| 5,523,118 | 6/1996 | Williams | 427/208.8 |
| 5,534,340 | 7/1996 | Gupta et al. | 428/286 |
| 5,573,841 | 11/1996 | Adam et al. | 428/219 |
| 5,587,225 | 12/1996 | Griesbach et al. | 428/198 |
| 5,595,828 | 1/1997 | Weber et al. | 428/537.5 |
| 5,780,369 | 7/1998 | Allison et al. | 442/384 |

INK JET PRINTABLE, SATURATED HYDROENTANGLED CELLULOSIC SUBSTRATE

BACKGROUND OF THE INVENTION

The present invention relates to polymer-reinforced or saturated substrates. The present invention also relates to printable materials, such as ink jet printable materials.

The reinforcement of paper by polymer impregnation (commonly referred to as latex saturation) is a long-established practice. The polymer employed typically is a synthetic material, most often a latex, and the paper may consist solely of cellulosic fibers or of a mixture of cellulosic and noncellulosic fibers. Polymer reinforcement is employed to improve one or more of such properties as dimensional stability, resistance to chemical and environmental degradation, resistance to tearing, embossability, resiliency, conformability, moisture and vapor transmission, and abrasion resistance, among others.

Saturated papers typically have been used as label print stock, base substrates for abrasive papers, and similar applications where strength is an essential requirement. They have not, however, been used for the preparation of garment care labels. Current garment card labels typically are woven or nonwoven fabrics printed by flexography, offset printing or hot stamp printing. While these products generally are satisfactory, the ability to use variable print information by computer generation is not possible. Because of cost constraints, color printing of the care and content label currently is not available. For example, the use of ink jet printing cannot be utilized because the water soluble dyes used in ink jet printers also would be soluble during washing of the garment and the printed information would be lost. Nevertheless, ink jet printing technology provides both advantages of variable information printing and color at low cost. Accordingly, there is a need for a low cost garment label material which is ink jet printable.

SUMMARY OF THE INVENTION

The present invention addresses some of the difficulties and problems discussed above by providing an ink jet printable, saturated hydroentangled fibrous web. The web includes fibers and a saturant. The fibers include from about 20 to 100 percent by weight of cellulosic fibers, based on the total weight of the fibers. From 0 to about 70 percent by weight of the fibers may be mercerized cellulosic fibers, again based on the total weight of the fibers. From about 80 to 0 percent by weight of the fibers, based on the total weight of the fibers, may be synthetic polymer fibers.

The fibrous web may be hydroentangled by any known means before the web is saturated. Hydroentangling results in a plurality of entanglement loci in the fibrous web. For example, the fibrous web may have a number of entanglement loci in a range of from about 62 to about 560 per square cm. As another example, the fibrous web may have a number of entanglement loci in a range of from about 142 to about 390 per square cm.

The saturant is present in the hydroentangled fibrous web at a level of from about 40 to about 85 percent, based on the dry weight of the fibers. When synthetic polymer fibers are present in the web, the saturant may be adapted to wet synthetic polymer fibers.

In general, the saturated hydroentangled fibrous web may have a basis weight of from about 30 to about 135 grams per square meter (gsm). In certain embodiments, from about 10 to about 50 percent by weight of the fibers may be mercerized cellulosic fibers. In other embodiments, from about 10 to about 40 percent by weight of the fibers may be synthetic polymer fibers. In still other embodiments, both mercerized cellulosic fibers and synthetic polymer fibers may be present. By way of illustration only, the synthetic polymer fibers may be polyester or polyamide fibers.

The saturated hydroentangled fibrous web is coated on at least one side with a composition which encompasses an aqueous dispersion of from about 2 to about 40 percent by dry weight, based on the dry weight of the coating composition, of a cationic polymer; and from about 60 to about 98 percent by dry weight, based on the dry weight of the coating composition, of a nonionic or cationic binder. The coating composition is thermally fusible and adapted to be receptive to ink jet inks and to retain the ink jet inks after being thermally fused. The coating composition also may contain from about 1 to about 5 parts by weight, based on the weight of the coating composition, of a nonionic or cationic surfactant. For example, the surfactant may be a nonionic surfactant. Coating may be accomplished by any means known to those having ordinary skill in the art.

Alternatively, the coating composition may encompass an aqueous dispersion of a powdered thermoplastic polymer and from about 10 to about 150 dry parts by weight, based on 100 dry parts by weight of the powdered thermoplastic polymer, of a binder. Again, the coating composition is thermally fusible and adapted to be receptive to ink jet inks and to retain the ink jet inks after being thermally fused. If desired, the coating composition may contain from about 1 to about 10 parts by weight, based on the weight of the coating composition, of a surfactant. By way of example, the surfactant may be a nonionic surfactant. Additionally, the coating composition may contain from about 2 to about 50 dry parts by weight, based on 100 dry parts by weight of the powdered thermoplastic polymer, of a cationic polymer, in which case the binder will be a nonionic or cationic binder and surfactant, if present, will be a nonionic or cationic surfactant, e.g., a nonionic surfactant.

By way of example, the powdered thermoplastic polymer may be a polyethylene. Further by way of example, the powdered thermoplastic polymer may be a polyamide. For example, the powdered thermoplastic polymer may be a copolymer of $\epsilon$-caprolactam and laurolactam. As an additional example, the cationic polymer may be an amide-epichlorohydrin copolymer. As yet a further example, the binder may be an ethylene-vinyl acetate copolymer.

The present invention further provides an ink jet printable, saturated hydroentangled fibrous substrate which includes a first layer composed of fibers and having first and second surfaces and a second layer which is a bonded nonwoven web having first and second surfaces. The second surface of the first layer overlays the first surface of the second layer. From about 20 to 100 percent by weight of the fibers of the first layer, based on the total weight of the fibers, are cellulosic fibers, and from 0 to about 70 percent by weight of the fibers of the first layer, again based on the total weight of the fibers, may be mercerized cellulosic fibers. From about 80 to 0 percent by weight of the fibers of the first layer, based on the total weight of the fibers, may be synthetic polymer fibers.

The fibrous substrate may be hydroentangled by any known means before the substrate is saturated. Hydroentangling, as noted earlier, results in a plurality of entanglement loci in the fibrous substrate. For example, the fibrous web may have a number of entanglement loci in a range of from about 62 to about 560 per square cm. As another example, the fibrous web may have a number of entanglement loci in a range of from about 142 to about 390 per square cm. The first layer may be hydroentangled into the second layer, or the second layer may be hydroentangled into the first layer. Alternatively, both layers may be hydroentangled into each other. Desirably, the first layer will be hydroentangled into the second layer.

A saturant is present in at least the first layer of the substrate at a level of from about 40 to about 85 percent, based on the dry weight of the fibers of the layer or layers in which the saturant is present. Thus, the saturant may be present in only the first layer or, desirable, in both the first layer and the second layer. When synthetic polymer fibers are present in either or both layers, the saturant may be adapted to wet synthetic polymer fibers. When saturant is present in both layers, the hydroentangled fibrous substrate properly may be referred to as a saturated hydroentangled fibrous substrate.

The first layer of the hydroentangled fibrous substrate typically may have a basis weight of from about 20 gsm to about 100 gsm. In certain embodiments, from about 10 to about 50 percent by weight of the fibers in the first layer may be mercerized cellulosic fibers. In other embodiments, from about 10 to about 40 percent by weight of the fibers in the first layer may be synthetic polymer fibers. In still other embodiments, both mercerized cellulose fibers and synthetic polymer fibers may be present. By way of illustration only, the synthetic polymer fibers may be polyester or polyamide fibers.

The second layer of the hydroentangled fibrous substrate typically may have a basis weight of from about 6 gsm to about 35 gsm. Such layer is a bonded nonwoven web.

The saturated hydroentangled fibrous web is coated on at least one side with the coating composition described above. That is, the coating may be located on either or both of the first surface of the first layer or the second surface of the second layer. Desirably, the coating will be on the first surface of the first layer.

The present invention additionally provides a method of preparing an ink jet printable, saturated hydroentangled fibrous web. The method includes providing a fibrous web composed at least in part of fibers. The fibrous web typically will have a basis weight of from about 30 gsm to about 135 gsm. From about 20 to 100 percent by weight, based on the total weight of the fibers, are cellulosic fibers. In addition, from 0 to about 70 percent by weight of the fibers, based on the total weight of the fibers, may be mercerized cellulosic fibers. From about 80 to 0 percent by weight of the fibers, based on the total weight of the fibers, may be synthetic polymer fibers. By way of example, from about 10 to about 50 percent by weight of the fibers may be mercerized cellulosic fibers. As another example, from about 10 to about 40 percent by weight of the fibers may be synthetic polymer fibers. The synthetic polymer fibers may be, by way of illustration only, polyester or polyamide fibers.

The fibrous web is hydroentangled by any known means to provide a plurality of entanglement loci in the fibrous web. For example, the hydroentangled fibrous web may have a number of entanglement loci in a range of from about 62 to about 560 per square cm. As another example, the hydroentangled fibrous web may have a number of entanglement loci in a range of from about 142 to about 390 per square cm.

The hydroentangled fibrous web is saturated at a level of from about 40 to about 85 percent, based on the dry weight of the fibers. If desired, the saturant may be adapted to wet synthetic polymer fibers.

Finally, the saturated hydroentangled fibrous web is coated on at least one side with the coating composition already described. Coating may be by any means known to those having ordinary skill in the art.

The present invention additionally provides a method of preparing an ink jet printable, saturated hydroentangled fibrous substrate. The method involves: providing a first layer having first and second surfaces and composed of fibers; providing a second layer having first and second surfaces and composed of a bonded nonwoven web; overlaying the second surface of the first layer on the first surface of the second layer; hydroentangling the first and second layers to give a hydroentangled fibrous substrate; saturating the hydroentangled fibrous web with a saturant a level of from about 40 to about 85 percent by dry weight, based on the dry weight of the fibers; and coating the saturated hydroentangled fibrous substrate on at least one side with the coating composition described above.

From about 20 to 100 percent by weight of the fibers of the first layer, based on the total weight of the of the fibers, are cellulosic fibers. From 0 to about 70 percent by weight of the fibers, based on the total weight of the fibers, may be mercerized cellulosic fibers. In addition, from about 80 to 0 percent by weight of the fibers of the first layer, based on the total weight of the fibers, may be synthetic polymer fibers.

The first layer typically has a basis weight of from about 20 gsm to about 100 gsm and the second layer may have a basis weight of from about 6 gsm to about 35 gsm. In addition, from about 10 to about 50 percent by weight of the fibers of the first layer may be mercerized cellulosic fibers. Alternatively, from about 10 to about 40 percent by weight of the fibers of the first layer may be synthetic polymer fibers. For example, the synthetic polymer fibers may be polyester or polyamide fibers. When synthetic polymer fibers are present, the saturant may be adapted to wet synthetic polymer fibers. The hydroentangled fibrous substrate may have a number of entanglement loci in a range of from about 62 to about 560 per square cm. For example, the hydroentangled fibrous substrate may have a number of entanglement loci in a range of from about 142 to about 390 per square cm. Finally, the coating composition may be applied by any means known to those having ordinary skill in the art.

DETAILED DESCRIPTION OF THE INVENTION

As used herein, the term "hydroentangled" (or "hydraulically entangled" or any variation thereof) with reference to a fibrous web or substrate means the web or substrate has been subjected to a hydraulic entangling or similar procedure whereby streams or jets of a fluid are employed to entangle the fibers in a fibrous web or substrate. Such jets of fluid orient and entangle fibers in the Z direction, i.e., through the thickness of the web or substrate. Where a jet impinges the web or substrate, a distinct hole or depression is formed which represent a locus of fiber entanglement. For convenience, these jet impingement sites, or loci, are referred to collectively hereinafter as "entanglement loci." For example, hydraulic entangling may be accomplished by means of conventional hydraulic entangling equipment, such as that described in U.S. Pat. No. 3,485,706 to Evans, which is incorporated herein by reference. Another hydroentangling process which may be employed is described in U.S. Pat. No. 4,144,370 to Bouolton which also is incorporated herein by reference. See also U.S. Pat. Nos. 4,931,355 and 4,879,170 to Radwanski et al., and U.S. Pat. Nos. 4,808,467 to Suskind et al., 4,612,226 to Kennette et al., and 5,284,703 to Everhart et al., each of which is incorporated herein by reference. Hydroentangling results in a plurality of entanglement loci in the fibrous web or substrate.

The term "bonded nonwoven web" is used herein to mean any nonwoven web composed of continuous or discontinuous fibers laid down on a foraminous surface in a random manner to form a web, in which a plurality of such fibers have been bonded to one another, either concurrently with or subsequent to web formation. For example, the bonded nonwoven web may be a web prepared by a melt-extrusion process in which melt-extrusion to form fibers is followed concurrently by web formation on a foraminous support. Such processes include, among others, meltblowing, conforming, and spunbonding. By way of illustration only, such processes are exemplified by the following references, each of which is incorporated herein by reference:

(a) meltblowing references include, by way of example, U.S. Pat Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4365 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No. 4, pp. 74–77 (1973);

(b) conforming references include U.S. Pat. Nos. 4,100,324 to R. A. Anderson et al. and 4,118,531 to E. R. Hauser; and (c) spunbonding references include, among others, U.S. Pat Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

Nonwoven webs prepared by such processes typically are bonded subsequent to web formation by, for example, pattern bonding. As used herein, the term "pattern bonding" refers to a process of bonding a nonwoven web in a pattern by the application of heat and pressure. Pattern bonding typically is carried out at a temperature in a range of from about 80° C. to about 180° C. and a pressure in a range of from about 150 to about 1,000 pounds per linear inch (about 59–178 kg/cm). The pattern employed typically will have from about 10 to about 250 bonds/inch$^2$ (about 1–40 bonds/cm$^2$) covering from about 5 to about 30 percent of the web surface area. Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868, supra, for illustrations of bonding patterns and a discussion of bonding procedures, which patents are incorporated herein by reference.

The term "carded web" is used herein to mean a nonwoven web prepared from staple fibers which usually are purchased in bales. The bales are placed in a picker which separates the fibers. Next, the fibers are sent through a combing or carding unit which further breaks apart and aligns the staple fibers in the machine direction so as to form a machine direction-oriented fibrous nonwoven web. Once the web has been formed, it is then bonded by one or more of several bonding methods to give a "bonded carded web."

As used herein, the term "bonding fibers" has reference to bicomponent thermoplastic polymer fibers in which the first component has a melting point which is at least about 50° C. lower than the melting point of the second component. The term "biocomponent thermoplastic polymer fibers" refers to fibers which have been formed from at least two thermoplastic polymers extruded from separate extruders but spun together to form one fiber. The polymers are arranged in substantially constantly positioned distinct zones across the cross-sections of the bicomponent fibers and extend continuously along the lengths of the bicomponent fibers. The configuration of such a bicomponent fiber may be, for example, a sheath-core arrangement wherein one polymer is surrounded by another, lower melting polymer, or a side-by-side arrangement. Bicomponent fibers are taught in U.S. Pat. No. 5,108,820 to Kaneko et al., U.S. Pat. No. 5,336,552 to Strack et al., and European Pat. No. 0 586 924. The component polymers may be present in any desired ratio.

The term "melting point" and variations thereof are used herein only in a qualitative sense and are not meant to refer to any particular test procedure. Reference herein to a melting point (temperature) or range is meant only to indicate an approximate temperature or range at which a polymer melts to an extent sufficient to form interfiber bonds.

The term "interfiber bonds" is used herein to mean the bonding of one fiber to another, adjacent fiber, typically at or near juncture points where one fiber meets or crosses another fiber. Bonding generally results from the film-forming characteristics of an adhesive or binder or from the melting of an adhesive or binder or a portion of either or both of the adjacent fibers.

A bonded carded web may be thermally pattern bonded in addition to or in place of through air bonded when bonding fibers are present in the web. For example, the thermally pattern bonded area may include from about 5 to about 30 percent of the total area of the web. Thermal pattern bonding desirably is carried out prior to the application of saturant.

The term "through air bonding" is used herein to mean a process of bonding a nonwoven bicomponent fiber web. The process involves winding the web at least partially around a screen-covered drum which is enclosed in a hood. Air which is sufficiently hot to melt one of the polymers of which the fibers of the web are made (e.g., the sheath polymer of the bicomponent thermoplastic polymer fibers) is forced from the hood, through the web and into the perforated roller. The air velocity may be, by way of example, between 100 and 500 feet per minute and the dwell time may be as long as 6 seconds. The melting and resolidification of the polymer provide the bonding.

The term "through air bonding" also includes the use of a hot air knife as described in commonly assigned U.S. patent application No. 08/362,328, filed on Dec. 22, 1994, which is incorporated herein by reference. Briefly, a hot air knife is a device which focuses a stream of heated air at a high linear flow rate onto a carded nonwoven web. For example, the linear flow rate of the stream of heated air may be in a range of from about 300 to about 3,000 meters per minute and the temperature of the stream may be in a range of from about 90° C. to about 290° C. Higher temperatures may be used, depending upon the melting point of the polymer employed as the first or sheath component in the bicomponent thermoplastic polymer fibers present in the web. The stream of heated air is arranged and directed by at least one slot which typically has a width of from about 3 to about 25 mm and is oriented in a substantially cross-machine direction over substantially the entire width of the web. A plurality of slots may be employed, if desired, and they may be arranged next to or separate from each other. The at least one slot may be continuous or discontinuous and may be composed of closely spaced holes. The hot air knife has a plenum to distribute and contain the heated air prior to exiting the slot. The plenum pressure of the air usually is from about 2 to about 22 mm Hg. The hot air knife typically is positioned from about 6 to about 254 mm above the surface of the carded web.

The term "synthetic polymer fibers" is used herein to mean fibers prepared from any synthetic polymer known to those having ordinary skill in the art, such as thermoplastic polymers and thermosetting polymers.

The term "thermoplastic polymer" is used herein to mean a polymer that softens when exposed to heat and returns to its original condition when cooled to room temperature. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly($\epsilon$-caprolactam), poly(hexamethylene adipamide), poly(hexamethylene sebacamide), and poly(11-aminoundecanoic acid); polyaramides, such as poly(imino-1,3-phenylene-iminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenylene-isopropylidene-1,4-phenylene) and poly(sulfonyl-1,4-phenylene-oxy-1,4-phenylenesulfonyl-4,4'-biphenylene); polycarbonates, such as poly(bisphenol A) or poly(carbonyldioxy-1,4-phenyleneisopropylidene-1,4-phenylene); polyesters, such as poly(ethylene terephthalate), poly(tetramethylene terephthalate), and poly(cyclohexylene-1,4-dimethylene terephthalate) or poly(oxymethylene-1,4-cyclohexylene-methyleneoxyterephthaloyl); polyaryl sulfides, such as poly(p-phenylene sulfide) or poly(thio-1,4-phenylene); polyimides, such as poly-(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; copolymers of the foregoing, such as acrylonitrile-butadiene-styrene (ABS) copolymers; and the like.

Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenolformaldehyde resins, including Novolacs and resols; and thermosetting polyesters, silicones, and urethanes.

As used herein, the term "saturant" is meant to include any polymeric material which may be used to bind the fibers of the fibrous web or substrate together. The saturant may be applied as either a solution of a polymer in a suitable solvent or as a dispersion of very small polymer particles in a liquid phase, such as water, e.g., as a latex. For example, the saturant may be any of the latex binders commonly employed for reinforcing papers. Such saturants are well known to those having ordinary skill in the art and include, by way of illustration only, polyacrylates, including polymethacrylates, poly(acrylic acid), poly(methacrylic acid), and copolymers of the various acrylate and methacrylate esters and the free acids; styrene-butadiene copolymers and carboxylated versions thereof; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers.

The term "binder" is used herein, with reference to the coating, to mean any film-forming polymeric material which may be dispersed in water to form a latex. Such materials are, of course, well known to those having ordinary skill in the art. Examples of binders include, by way of illustration only, acrylic latices, ethylene-vinyl acetate copolymer latices, and polyethylene dispersions.

As stated earlier, the present invention provides an ink jet printable, saturated hydroentangled fibrous web which includes fibers and a saturant. The fibers include from about 20 to 100 percent by weight, based on the total weight of the fibers, of cellulosic fibers and from 0 to about 70 percent by weight, based on the total weight of the fibers, of mercerized cellulosic fibers. For example, from about 75 to about 100 percent by weight of the fibers may be cellulosic fibers (the term "cellulosic fibers" includes mercerized cellulosic fibers). As another example, from about 20 to about 60 of the fibers may be mercerized cellulosic fibers. From about 80 to 0 percent by weight of the fibers, based on the total weight of the fibers, may be synthetic polymer fibers. For example, from about 25 to 0 percent by weight of the fibers may be synthetic polymer fibers. In certain embodiments, from about 10 to about 50 percent by weight of the fibers may be mercerized cellulosic fibers. In other embodiments, from about 10 to about 40 percent by weight of the fibers may be synthetic polymer fibers. In still other embodiments, both mercerized cellulosic fibers and synthetic polymer fibers may be present. By way of illustration only, the synthetic polymer fibers may be polyester or polyamide fibers.

Sources of cellulosic fibers include, by way of illustration only, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie;

leaves, such as abaca and sisal; and seeds, such as cotton and cotton linters. Softwoods and hardwoods are the more commonly used sources of cellulosic fibers; the fibers may be obtained by any of the commonly used pulping processes, such as mechanical, chemimechanical, semichemical, and chemical processes. Examples of softwoods include, by way of illustration only, longleaf pine, shortleaf pine, loblolly pine, slash pine, Southern pine, black spruce, white spruce, jack pine, balsam fir, douglas fir, western hemlock, redwood, and red cedar. Examples of hardwoods include, again by way of illustration only, aspen, birch, beech, oak, maple and gum.

In general, the fibrous web may have a basis weight of from about 30 gsm to about 135 gsm. For example, the basis weight of the fibrous web may be in a range of from about 60 gsm to about 100 gsm.

The fibrous web may be hydroentangled by any known means before the web is saturated. Hydraulic entangling may be carried out with any appropriate high pressure working fluid, such as, by way of example only, water. The working fluid typically flows through a manifold which evenly distributes the fluid to a series of individual holes or orifices. These holes or orifices may be, by way of illustration, from about 0.003 to about 0.015 inch (from about 0.07 to about 1.6 m) in diameter. For example, hydroentangling may utilize a manifold produced by Honeycomb Systems incorporated of Biddeford, Me. containing a strip having 0.007-inch (about 0.18-mm) diameter orifices, 30 orifices per inch (about 12 orifices per cm), and one row of orifices. Many other manifold configurations and combinations may be used, however. For example, a single manifold may be used or several manifolds may be arranged in succession. As another example, the fibrous web may have a number of entanglement loci in a range of from about 62 to about 560 per square cm. As a further example, the fibrous web may have a number of entanglement loci in a range of from about 142 to about 390 per square cm.

In the hydraulic entangling process, the high pressure working fluid passes through the orifices at a pressure ranging from about 200 to about 2,000 pounds per square inch gage (psig) (from about 14 to about 140 kilograms per square centimeter, or $kg/cm^2$). The fluid impacts the web or substrate which is supported by a foraminous surface which may be, for example, a single plane mesh having a mesh count of from about 1,600 to about 10,000. The foraminous surface also may be a multiple plane mesh having a mesh count of from about 2,500 to about 40,000 per plane. As used herein, the term "mesh count" refers to a number which is the product of the number of wires in a wire mesh screen in both the machine (MD) and cross-machine (CD) directions in a given unit area. For example, a wire mesh screen having 100 wires per inch in the machine direction and 100 wires per inch in the cross machine direction would have a mesh count of 10,000 per square inch. Vacuum slots or other openings may be located directly beneath the hydroentangling manifold or beneath the foraminous surface downstream of the hydroentangling manifold so that excess fluid is withdrawn from the hydraulically entangled web or substrate.

The saturant is present in the saturated hydroentangled fibrous web at a level of from about 40 to about 85 percent by weight, based on the dry weight of the fibers. For example, the level of saturant in the saturated hydroentangled fibrous web may be in a range of from about 50 to about 75 percent by weight. When synthetic polymer fibers are present in the web, the saturant may be adapted to wet synthetic polymer fibers.

The saturated hydroentangled fibrous web is coated on at least one side with a composition which encompasses an aqueous dispersion of from about 2 to about 40 percent by dry weight, based on the dry weight of the coating composition, of a cationic polymer; and from about 60 to about 98 percent by dry weight, based on the dry weight of the coating composition, of a nonionic or cationic binder. The coating composition is thermally fusible and adapted to be receptive to ink jet inks and to retain the ink jet inks after being thermally fused. The coating composition also may contain from about 1 to about 5 parts by weight, based on the weight of the coating composition, of a nonionic or cationic surfactant. For example, the surfactant may be a nonionic surfactant.

Alternatively, the coating composition may encompass an aqueous dispersion of a powdered thermoplastic polymer and from about 10 to about 150 dry parts by weight, based on 100 dry parts by weight of the powdered thermoplastic polymer, of a binder. Again, the coating composition is thermally fusible and adapted to be receptive to ink jet inks and to retain the ink jet inks after being thermally fused. If desired, the coating composition may contain from about 1 to about 10 parts by weight, based on the weight of the coating composition, of a surfactant. By way of example, the surfactant may be a nonionic surfactant. Additionally, the coating composition also may contain from about 2 to about 50 dry parts by weight, based on 100 dry parts by weight of the powdered thermoplastic polymer, of a cationic polymer, in which case the binder will be a nonionic or cationic binder and surfactant, if present, will be a nonionic or cationic surfactant, such as, by way of example, a nonionic surfactant.

By way of example, the powdered thermoplastic polymer may be a polyethylene. Further by way of example, the powdered thermoplastic polymer may be a polyamide. For example, the powdered thermoplastic polymer may be a copolymer of ϵ-caprolactam and laurolactam. As an additional example, the cationic polymer may be an amide-epichlorohydrin copolymer. As yet a further example, the binder may be an ethylene-vinyl acetate copolymer.

The present invention further provides an ink jet printable, saturated hydroentangled fibrous substrate which includes a first layer composed of fibers and having first and second surfaces and a second layer which is a bonded nonwoven web having first and second surfaces. The second surface of the first layer overlays the first surface of the second layer. From about 20 to 100 percent by weight of the fibers of the first layer, based on the total weight of the fibers, are cellulosic fibers. From 0 to about 70 percent by weight of the fibers of the first layer, again based on the total weight of the fibers, may be mercerized cellulosic fibers. For example, from about 75 to about 100 percent by weight of the fibers may be cellulosic fibers. As another example, from about 20 to about 60 of the cellulosic fibers may be mercerized fibers. From about 80 to 0 percent by weight of the fibers of the first layer, based on the total weight of the fibers, may be synthetic polymer fibers. For example, in certain embodiments, from about 10 to about 50 percent by weight of the fibers in the first layer may be mercerized cellulosic fibers. In other embodiments, from about 10 to about 40 percent by weight of the fibers in the first layer may be synthetic polymer fibers. In still other embodiments, both mercerized cellulose fibers and synthetic polymer fibers may be present. By way of illustration only, the synthetic polymer fibers may be polyester or polyamide fibers.

The first layer of the hydroentangled fibrous substrate typically may have a basis weight of from about 20 gsm to about 100 gsm. For example, the basis weight of the first layer may be in a range of from about 60 gsm to about 95 gsm.

The second layer of the hydroentangled fibrous substrate typically may have a basis weight of from about 6 gsm to about 35 gsm. Such layer is a bonded nonwoven web as already defined. Desirably, the bonded nonwoven web will be a spunbonded web.

Numerous spunbonded webs prepared from various thermoplastic polymers are commercially available. The most extensively utilized commercial materials are made from filaments of polyamides, polyesters, and polyolefins such as polyethylene and polypropylene, although other polymers, such as rayon, cellulose acetate, acrylics also may be employed. Exemplary of the commercially available spunbonded web materials that may be employed in the present invention are the gas-bonded nylon filament materials sold under the trademark Cerex® and the lightly needle-tacked polyester materials sold under the trademark Reemay® (Reemay, Inc. Old Hickory, Tenn.). Of course, other commercially available spunbonded web materials also may be employed with good results.

The fibrous substrate may be hydroentangled by any known means, as described earlier, before the substrate is saturated. Hydroentangling results in a plurality of entanglement loci in the web. For example, the number of entanglement loci may be in a range of from about 62 to about 560 per square cm. As another example, the number of entanglement loci may be in a range of from about 142 to about 390 per square cm.

A saturant is present in at least the first layer of the substrate at a level of from about 40 to about 85 percent, based on the dry weight of the fibers of the layer or layers in which the saturant is present. Thus, the saturant may be present in only the first layer or in both the first layer and the second layer. When synthetic polymer fibers are present in either or both layers, the saturant may be adapted to wet synthetic polymer fibers.

The saturated hydroentangled fibrous substrate is coated on at least one side with the coating composition described earlier. Desirable, the coating will be on the first surface of the first layer. Coating may be accomplished by any means known to those having ordinary skill in the art.

The present invention additionally provides a method of preparing an ink jet printable, saturated hydroentangled fibrous web. The method includes providing a fibrous web. The fibrous web typically will have a basis weight of from about 30 gsm to about 135 gsm. From about 20 to 100 percent by weight of the fibers are cellulosic fibers, and from 0 to about 70 percent by weight of the fibers may be mercerized cellulosic fibers, both based on the total weight of the fibers. From about 80 to 0 percent by weight of the fibers, based on the total weight of the fibers, may be synthetic polymer fibers. By way of example, from about 10 to about 50 percent by weight of the fibers may be mercerized cellulosic fibers. As another example, from about 10 to about 40 percent by weight of the fibers may be synthetic polymer fibers. The synthetic polymer fibers may be, by way of illustration only, polyester or polyamide fibers.

The fibrous web then is hydroentangled by any known means, as already described, to give a web having a plurality of entanglement loci. For example, the number of entanglement loci may be in a range of from about 62 to about 560 per square cm. As another example, the number of entanglement loci may be in a range of from about 142 to about 390 per square cm.

The hydroentangled fibrous web is saturated at a level of from about 40 to about 85 percent, based on the dry weight of the fibers. If desired, the saturant may be adapted to wet synthetic polymer fibers.

The saturated hydroentangled fibrous web then is coated on at least one side with the coating composition described hereinbefore, In certain instances, depending upon the openness of the web and the viscosity of the coating composition, it may be either desirable or necessary to apply two or more layers of the coating composition to ensure complete coverage. Such two or more layers may be formed from the same coating composition or two or more different coating compositions. Thus, the term "coating" is used herein to include a single layer of a coating composition and multiple layers of the same or different coating compositions.

The present invention additionally provides a method of preparing an ink jet printable, saturated hydroentangled fibrous substrate. The method involves: providing a first layer having first and second surfaces and composed of fibers; providing a second layer having first and second surfaces and composed of a bonded nonwoven web; overlaying the second surface of the first layer on the first surface of the second layer; hydroentangling the first and second layers to give a hydroentangled fibrous substrate; saturating the hydroentangled fibrous web with a saturant a level of from about 40 to about 85 percent by dry weight, based on the dry weight of the fibers; and coating at least one side of the saturated hydroentangled fibrous substrate with the coating composition already described.

From about 20 to 100 percent by weight of the fibers of the first layer, based on the total weight of the of the fibers, are cellulosic fibers and from 0 to about 70 percent by weight of the fibers may be mercerized cellulosic fibers, again based on the total weight of the fibers. In addition, from about 80 to 0 percent by weight of the fibers of the first layer, based on the total weight of the fibers, may be synthetic polymer fibers.

The first layer typically has a basis weight of from about 20 gsm to about 100 gsm and the second layer may have a basis weight of from about 6 gsm to about 35 gsm. In addition, from about 10 to about 50 percent by weight of the fibers of the first layer may be mercerized cellulosic fibers. Alternatively, from about 10 to about 40 percent by weight of the fibers of the first layer may be synthetic polymer fibers. For example, the synthetic polymer fibers may be polyester or polyamide fibers. When synthetic polymer fibers are present, the saturant may be adapted to wet synthetic polymer fibers. The hydroentangled fibrous substrate may have a number of entanglement loci in a range of from about 62 to about 560 per square cm. For example, the hydroentangled fibrous substrate may have a number of entanglement loci in a range of from about 142 to about 390 per square cm.

The hydroentangling process variables generally are determined, at least in part, by the basis weight and density of the web or substrate being hydroentangled. Increased water jet pressure typically results in higher internal strength of the web as measured by delamination tests. Water jet pressure also contributes to a lowering of the stiffness of the saturated hydroentangled fibrous web. Similar enhancements of increased internal bond strength and reduced stiffness also may be achieved by maintaining the water pressure constant but subjecting the web to multiple passes under the hydrentangling jets. This may be done by using multiple banks or rows of jet manifolds. Finally, hydroentangling desirably is carried out with the first layer facing the hydroentangling jets. Depending upon such factors as jet pressure, the thickness of the first and second layers, and second layer fiber diameters, among others, it may be appropriate to conduct hydroentangling with the second layer facing the jets or to hydroentangle both sides, either simultaneously or sequentially.

Typically, a hydroentangled substrate is significantly more absorbent than an otherwise identical substrate which has not been hydroentangled. In addition, the saturated hydroentangled substrate remains absorbent, even with relatively high levels of saturant. In contrast, conventional latex saturated cellulosic webs lose absorbent properties in proportion to the amount of saturant present in the web. Not only is the saturated hydroentangled substrate of the present invention still absorbent, but it also provides an excellent surface for absorbing printing inks or specialized coatings.

Latex saturation of the hydroentangled web or substrate may be carried out by any means known to those having ordinary skill in the art. Typically, a formed web is exposed to an excess of the impregnating dispersion or latex, run through a nip, and dried. One particular process passes the web through squeeze rolls which apply latex from a saturation latex basin and then provide the web to a number of drying cans held at temperatures of about 90° C. to about 150° C. The latex saturated web then is wound by a roll windup device and is ready for commercial use. However, the impregnating dispersion may be applied by other methods, such as brushing, doctor blading, spraying, and direct and offset gravure printing or coating and the present invention is not limited to any particular impregnating process. The hydroentangled substrate can be easily handled on ordinary equipment because of the inherent strength of the web. Drying of the substrate is rapid due to the open characteristic of the hydroentangled surface.

Depending upon the basis weights of the first and second layers and the hydroentangling conditions, both sides of the hydroentangled fibrous substrate may be essentially same or different. In the former case, saturation of the substrate is most likely to involve both layers, whether or not the saturant wets the second layer fibers.

In the latter case, however, the first layer and second layers, through hydroentangling together to a significant degree, may retain their original characteristics. That is, the substrate may have, in effect, two different sides. If the saturant does not wet the second layer fibers, saturation generally will be limited to the first layer, regardless of the method used to apply saturant to the substrate. Whether or not the saturant wets the second layer fibers, the method of applying the saturant may reduce or minimize the presence of saturant in the second layer. For example, brushing or spraying the saturant only on the first layer side of the substrate may limit penetration of the saturant into the second layer.

The latex saturant is composed of natural, synthetic or a combination of natural and synthetic polymers. In addition to latex, other soluble polymers and additives may be incorporated into the saturant for special end use properties. Such additives may include pigments, fillers, clay, titanium dioxide, crosslinking agents and rheology modifiers. For example, both crosslinking agents and rheology modifiers have been utilized with good results. The hydroentangled web is impregnated with latex by directing the web through a bath of saturant containing the latex. The web is then squeezed between rotating press rolls to remove excess saturant. The amount of latex added to the hydroentangled web should be in the range of 40 to 85 dry grams of saturant to 100 dry grams of fiber. Next the web is dried at a temperature of 107° C. on heated rotating drums. The web is then wound while hot into a roll to cure and develop the necessary wet strength properties of the web. In some cases this cure for wet strength can take place at room temperature when specific polymers and curing aids are used.

The present invention is further described by the examples which follow. Such examples, however, are not to be construed as limiting in any way either the spirit or the scope of the present invention. In the examples, one latex saturant and two coating compositions were employed. These are summarized below in Tables 1–3, respectively.

TABLE 1

Latex Saturant

| Ingredient | % Solids | Parts Dry | Parts Wet |
| --- | --- | --- | --- |
| Water | — | — | 114 |
| Polyacrylate latex saturant (Hycar ® 26683, B. F. Goodrich Company, Cleveland, OH) | 47 | 100 | 213 |
| Pigment dispersion (titanium dioxide dispersion, PD-1, DuPont, Wilmington, DE) | 70 | 20 | 29 |
| Ammonia | 28 | 0.4 | 1.4 |
| Final saturant composition | 33.7 | 120.4 | 357 |

TABLE 2

Coating Composition A

| Ingredient | % Solids | Parts Dry | Parts Wet |
| --- | --- | --- | --- |
| Water | — | — | 302 |
| Polyethoxylated alkyl phenol nonionic surfactant (Triton ® X-100, Rohm & Haas, Spring House, PA) | 25 | 5 | 20 |
| Orgasol ® 3501 EX D NAT 1 (an 8-micron average particle size copolymer of nylon 6 and nylon 12, having a melting point of 160° C., available from Elf Atochem, France) | 100 | 100 | 100 |
| Reten ® 204LS, an amide-epichlorohydrin cationic copolymer (Hercules Inc., Wilmington, DE) | 14.7 | 13.5 | 92 |
| Airflex ® 140, a poly(vinyl alcohol)-stabilized ethylene-vinyl acetate copolymer binder (Air Products and Chemicals, Inc., Allentown, PA) | 56.6 | 50 | 88 |
| Final coating composition | 28 | 168.5 | 602 |

TABLE 3

Coating Composition B

| Ingredient | % Solids | Parts Dry | Parts Wet |
| --- | --- | --- | --- |
| Water | — | — | 290 |
| Polyethoxylated alkyl phenol nonionic surfactant (Triton ® X-100, Rohm & Haas, Spring House, PA) | 25 | 5 | 20 |
| Orgasol ® 3501 EX D NAT 1 (an 8-micron average particle size copolymer of nylon 6 and nylon 12, having a melting point of 160° C., available from Elf Atochem, France) | 100 | 100 | 100 |
| Reten ® 204LS, an amide-epichlorohydrin cationic copolymer (Hercules Inc., Wilmington, DE) | 14.7 | 13.5 | 92 |

TABLE 3-continued

Coating Composition B

| Ingredient | % Solids | Parts Dry | Wet |
|---|---|---|---|
| Airflex ® 124, a poly(vinyl alcohol)-stabilized ethylene-vinyl acetate copolymer binder (Air Products and Chemicals, Inc., Allentown, PA) | 50 | 50 | 100 |
| Final coating composition | 28 | 168.5 | 602 |

EXAMPLE 1

A wet cellulosic web composed of 70 percent by weight of softwood pulp and 30 percent by weight of recycled pulp and having a dry basis weight of 86 gsm was overlayed on an approximately 12-gsm nonwoven web of spunbond polypropylene. The resulting substrate was hydroentangled from the cellulosic web side with four consecutive passes through the water jets of a hydroentangling unit having a water jet pressure of 1,400 psi. The hydroentangled substrate was dried and saturated to an add-on level of 65 dry grams of saturant to 100 dry grams of fiber. The cellulosic web side of the resulting saturated substrate was coated with Coating Composition A by means of a Meyer rod; the coating dry weight was 26 gsm.

EXAMPLE 2

The procedure of Example 1 was repeated, except that the cellulosic web was composed of southern softwood pulp and had a basis weight of 67 gsm.

EXAMPLE 3

A wet cellulosic web composed of 50 percent by weight of southern softwood pulp and 50 percent by weight of southern softwood Kraft pulp and having a dry basis weight of 37 gsm was overlayed on an approximately 12 gsm nonwoven web of spunbond polypropylene. The resulting substrate was hydroentangled from the cellulosic web side with four consecutive passes through the water jets of a hydroentangling unit having a water jet pressure of 1,400 psi. The hydroentangled substrate was dried and saturated to an add-on level of 65 dry grams saturant to 100 dry grams of fiber. The cellulosic web side of the resulting saturated substrate was blade-coated with Coating Composition A at a dry-weight level of 2 gsm. The coating was overlayed with a 2-gsm dry weight layer applied by means of a Meyer rod. The total dry coating weight was 4 gsm.

EXAMPLE 4

The procedure of Example 3 was repeated, except that both of the coating layers were applied by a Meyer rod, the dry basis weight of the first coating layer was 1.8 gsm, and that of the second coating layer was 1.6 gsm, for a total dry coating weight of 3.4 gsm.

EXAMPLE 5

The procedure of Example 3 was repeated, except that the saturant contained 1.5 dry parts of a polyfunctional aziridine crosslinking agent (Xama-7®, B. F. Goodrich Company, Cleveland, Ohio), the two layers of coating had dry basis weights of 1.4 gsm and 2 gsm, respectively, and the coating composition employed was Coating Composition A to which 0.77 dry parts of a rheology modifier had been added (Acrysol® RM-8W, Rohm & Haas Company, Philadelphia, Pa.).

EXAMPLE 6

The procedure of Example 5 was repeated, except that the two layers of the coating composition had dry basis weights of 1.9 gsm and 1 gsm, respectively, and both layers of coating composition were applied by a Meyer rod.

EXAMPLE 7

The procedure of Example 3 was repeated, except that the saturant add-on level was 85 dry grams of saturant to 100 dry grams of fiber, Coating Composition B was employed, and both layers of the coating composition were applied by a Meyer rod at levels of 2.1 gsm and 1.8 gsm, respectively, for a total coating weight of 3.9 gsm, all on a dry weight basis.

EXAMPLE 8

The procedure of Example 3 was repeated, except that the saturant contained 1.5 dry parts of a polyfunctional aziridine crosslinking agent (Xama-7®, B. F. Goodrich Company, Cleveland, Ohio) and 2 dry parts of a sizing agent (Aquapel®752, Hercules Corporation, Wilmington, Del.), the saturant add-on level was 83 dry parts of saturant to 100 dry parts of fiber, the two layers of coating had dry basis weights of 1.8 gsm and 1.7 gsm, respectively (for a total dry coating weight of 3.5 gsm), and the coating composition employed was Coating Composition B to which 0.77 dry parts of a rheology modifier had been added (Acrysol® RM-8W, Rohm & Haas Company, Philadelphia, Pa.)).

EXAMPLE 9

The procedure of Example 8 was repeated, except that the two layers of coating composition were applied as described in Example 3 at levels of 1.1 gsm and 1.6 gsm, respectively, for a total dry coating weight of 2.7 gsm.

Each coated substrate was printed with the standard test pattern using a standard desktop Canon BJC-600 color ink jet printer. The test pattern included areas of solid color, colored pattern, and black and white print. The printed substrate then was fused at 149° C. for 30 seconds between two sheets of Mylar® film in a conventional T-shirt press. The fused printed substrate was trimmed to 2 inches by 4.5 inches (about 5 cm by about 11.4 cm) and sewn with a conventional home sewing machine onto a bath towel. The towel then was machine washed and dried in a home washing machine and dryer.

After washing, all substrates were evaluated for substrate integrity, e.g., the absences of holes and minimal or no fraying at the edges. Print color intensity was evaluated for fading and washing out of color. Failure of the coating to adhere to the substrate was judged as color failure because areas of color were missing. Legibility of the printed area also was evaluated. Coating adhesion also affected this criterion if areas of print were missing. The evaluation results are summarized in Table 4.

TABLE 4

Evaluation Summary

| Ex. | Wash Cycles | Substrate Integrity | Color Intensity | Legibility |
| --- | --- | --- | --- | --- |
| 1 | 50 | Excellent | Good | Excellent |
| 2 | 50 | Excellent | Good | Excellent |
| 3 | 21 | Excellent | Good | Excellent |
| 4 | 21 | Good | Excellent | Excellent |
| 5 | 21 | Good | Excellent | Excellent |
| 6 | 21 | Good | Good | Excellent |
| 7 | 50 | Good | Excellent | Excellent |
| 8 | 50 | Failed | Good | Good |
| 9 | 50 | Failed | Fair | Poor |

Although Examples 1 and 2 demonstrated that the coating concept of the present invention worked well, the amount of coating applied was economically excessive. A heavy application of the coating composition was employed initially to ensure the complete coating of the web surface since the hydroentangled web was very open or porous. Lighter applications result in excessive penetration of the coating composition into the web, leaving too little on the surface of the web for acceptable printing. Accordingly, the coating method was changed to two applications, with reduced amounts of coating composition per application, to improve the amounts of coating composition retained on the web surface. This change resulted in excellent results with reduced amounts of coating, as shown by Examples 3–7.

The addition of a rheology modifier to the coating composition did not appear to significantly reduce penetration of the coating composition into the web (Example 5). Other attempts to reduce penetration included the addition of a crosslinking agent and sizing agent to the coating composition. However, the use of such materials resulted in reduced durability during the washing procedure for reasons which are not understood. Because the wash test was lengthy, initial screening efforts included only 21 cycles. However, some sources in the garment label industry require 25 cycles, while others require 50 cycles.

In summary, the discovery of a fusible, ink jet printable coating on a saturated hydroentangled substrate provides the option of variable information printing and the capability of color ink jet printing on a substrate that is machine washable. Substrates in use today are not durable after printing with water-soluble ink jet inks. Hydroentangling of the substrate combined with latex saturation give the durability necessary to maintain web integrity during the machine washing cycle. The coating utilized in the present invention allows the water-soluble ink jet inks to be absorbed into the coating. After fusing the printed coating, the powdered thermoplastic polymer is partially melted, trapping the ink in the coating surface. Such fusing process permanently attaches the inks to the coating, thereby rendering them durable during washing.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An ink jet printable, saturated hydroentangled fibrous web comprising:
   a fibrous web having first and second surfaces and a plurality of entanglement loci as a consequence of subjecting the fibrous web to high pressure fluid jets, the fibrous web being comprised of fibers and a saturant, in which
   the fibrous web has a basis weight of about 30 to about 135 grams per square meter,
   about 20 to 100 percent by weight of the fibers, based on the total dry weight of the fibers, are cellulosic fibers;
   0 to about 70 percent by weight of the fibers, based on the total dry weight of the fibers, are mercerized cellulosic fibers;
   about 80 to 0 percent by weight of the fibers, based on the total dry weight of the fibers, are synthetic polymer fibers; and
   the saturant is present at a level of about 40 to about 85 percent, based on the dry weight of the fibers; and
   a coating which is receptive to ink jet ink overlaying the first or second surface of the fibrous web, the coating comprising:
      about 10 to about 40 percent by weight, based on the weight of the coating, of a cationic polymer; and
      about 60 to about 90 percent by weight, based on the weight of the coating, of a nonionic or cationic binder;
   wherein the coating is thermally fusible and adapted to be receptive to ink jet inks and to retain the ink jet inks after being thermally fused.

2. The ink jet printable, saturated hydroentangled fibrous web of claim 1, in which the fibrous web has a basis weight of about 60 to about 95 grams per square meter.

3. The ink jet printable, saturated hydroentangled fibrous web of claim 1, in which the fibrous web has a number of entanglement loci in a range of about 62 to about 560 per square cm.

4. The ink jet printable, saturated hydroentangled fibrous web of claim 1, in which the fibrous web has a number of entanglement loci in a range of about 142 to about 390 per square cm.

5. The ink jet printable, saturated hydroentangled fibrous web of claim 1, in which the coating further comprises about 1 to about 5 parts by weight, based on the weight of the coating, of a nonionic or cationic surfactant.

6. The ink jet printable, saturated hydroentangled fibrous web of claim 5, in which the surfactant is a nonionic surfactant.

7. The ink jet printable, saturated hydroentangled fibrous web of claim 1, in which the coating is overlaying the first surface of the fibrous web.

8. An ink jet printable, saturated hydroentangled fibrous web comprising:
   a fibrous web having first and second surfaces and a plurality of entanglement loci as a consequence of subjecting the fibrous web to high pressure fluid jets, the fibrous web being comprised of fibers and a saturant, in which
   the fibrous web has a basis weight of about 20 to about 135 grams per square meter;
   about 20 to 100 percent by weight of the fibers, based on the total dry weight of the fibers, are cellulosic fibers;
   0 to about 70 percent by weight of the fibers, based on the total dry weight of the fibers, are mercerized cellulosic fibers;
   about 80 to 0 percent by weight of the fibers, based on the total dry weight of the fibers, are synthetic polymer fibers; and the saturant is present at a level of about 40 to about 85 percent, based on the dry weight of the fibers; and a coating which is receptive to ink jet ink overlaying the first or second surface of the fibrous web, the coating comprising:
a powdered thermoplastic polymer; and
about 10 to about 150 dry parts by weight, based on 100 dry parts by weight of the powdered thermoplastic polymer, of a binder;

wherein the coating is thermally fusible and adapted to be receptive to ink jet inks and to retain the ink jet inks after being thermally fused.

9. The ink jet printable, saturated hydroentangled fibrous web of claim 8, in which the coating further comprises about 1 to about 5 parts by weight, based on the weight of the coating, of a surfactant.

10. The ink jet printable, saturated hydroentangled fibrous web of claim 9, in which the surfactant is a nonionic surfactant.

11. The ink jet printable, saturated hydroentangled fibrous web of claim 8; in which the coating further comprises about 2 to about 50 dry parts by weight, based on 100 dry parts by weight of the powdered thermoplastic polymer, of a cationic polymer.

12. The ink jet printable, saturated hydroentangled fibrous web of claim 11, in which the coating further comprises about 1 to about 10 parts of a nonionic or cationic surfactant.

13. The ink jet printable, saturated hydroentangled fibrous web of claim 12, in which the surfactant is a nonionic surfactant.

14. The ink jet printable, saturated hydroentangled fibrous web of claim 8, in which the powdered thermoplastic polymer is a polyethylene.

15. The ink jet printable, saturated hydroentangled fibrous web of claim 8, in which the powdered thermoplastic polymer is a polyamide.

16. The ink jet printable, saturated hydroentangled fibrous web of claim 15, in which the powdered thermoplastic polymer is a copolymer of ε-caprolactam and laurolactam.

17. The ink jet printable, saturated hydroentangled fibrous web of claim 8, in which the cationic polymer is an amide-epichlorohydrin copolymer.

18. The ink jet printable, saturated hydroentangled fibrous web of claim 8, in which the binder is an ethylene-vinyl acetate copolymer.

19. The ink jet printable, saturated hydroentangled fibrous web of claim 8, in which the coating is overlaying the first surface of the fibrous web.

20. An ink jet printable, hydroentangled fibrous substrate comprising:
a first layer having first and second surfaces and comprised of fibers, in which
the first layer has a basis weight of about 20 to about 100 grams per square meter;
about 20 to 100 percent by weight of the fibers, based on the total dry weight of the fibers, are cellulosic fibers;
0 to about 70 percent by weight of the fibers, based on the total dry weight of the fibers, are mercerized cellulosic fibers; and
about 80 to 0 percent by weight of the fibers, based on the total dry weight of the fibers, are synthetic polymer fibers;
a second layer having first and second surfaces, with the second surface of the first layer overlaying the first surface of the second layer, which second layer comprises a bonded nonwoven web having a basis weight of about 6 to about 35 grams per square meter, in which at least some of the fibers of the first and second layers have been entangled together in a plurality of entanglement loci as a consequence of the first and second layers having been subjected to high pressure liquid jets; and
a saturant which is present in at least the first layer at a level of about 40 to about 85 percent, based on the dry weight of the fibers; and
a coating which is receptive to ink jet ink overlaying the first surface of the first layer or the second surface of the second layer, the coating comprising:
about 10 to about 40 percent by weight, based on the weight of the coating, of a cationic polymer; and
about 60 to about 90 percent by weight, based on the weight of the coating, of a nonionic or cationic binder;

wherein the coating is thermally fusible and adapted to be receptive to ink jet inks and to retain the ink jet inks after being thermally fused.

21. The ink jet printable, saturated hydroentangled fibrous substrate of claim 20, in which the first layer has a basis weight of about 60 to about 95 grams per square meter.

22. The ink jet printable, saturated hydroentangled fibrous substrate of claim 20, in which the number of entanglement loci is in a range of about 62 to about 560 per square cm.

23. The ink jet printable, saturated hydroentangled fibrous substrate of claim 20, in which the number of entanglement loci is in a range of about 142 to about 390 per square cm.

24. The ink jet printable, saturated hydroentangled fibrous substrate of claim 20, in which the coating further comprises about 1 to about 5 parts by weight, based on the weight of the coating composition, of a nonionic or cationic surfactant.

25. The ink jet printable, saturated hydroentangled fibrous substrate of claim 24, in which the surfactant is a nonionic surfactant.

26. The ink jet printable, saturated hydroentangled fibrous substrate of claim 20, in which the coating is overlaying the first surface of the first layer.

27. An ink jet printable, saturated hydroentangled fibrous substrate comprising:
a first layer having first and second surfaces and comprised of fibers and a saturant, in which
the first layer has a basis weight of about 20 to about 100 grams per square meter;
about 20 to 100 percent by weight of the fibers, based on the total dry weight of the fibers, are cellulosic fibers;
0 to about 70 percent by weight of the fibers, based on the total dry weight of the fibers, are mercerized cellulosic fibers; and
about 80 to 0 percent by weight of the fibers, based on the total dry weight of the fibers, are synthetic polymer fibers; and
the saturant is present at a level of about 40 to about 85 percent, based on the dry weight of the fibers;
a second layer having first and second surfaces, with the second surface of the first layer overlaying the first surface of the second layer, which second layer comprises a bonded nonwoven web having a basis weight of about 6 to about 35 grams per square meter; and
a coating which is receptive to ink jet ink overlaying the first surface of the first layer or the second surface of the second layer, the coating comprising:
a powdered thermoplastic polymer; and
about 10 to about 150 dry parts by weight, based on 100 dry parts by weight of the powdered thermoplastic polymer, of a binder;

wherein the coating is thermally fusible and adapted to be receptive to ink jet inks and to retain the ink jet inks after being thermally fused.

28. The ink jet printable, saturated hydroentangled fibrous substrate of claim 27, in which the first layer has a basis weight of about 60 to about 95 grams per square meter.

29. The ink jet printable, saturated hydroentangled fibrous substrate of claim 27, in which the first layer has a number of entanglement loci in a range of about 62 to about 560 per square cm.

30. The ink jet printable, saturated hydroentangled fibrous substrate of claim 27, in which the first layer has a number of entanglement loci in a range of about 142 to about 390 per square cm.

31. The ink jet printable, saturated hydroentangled fibrous substrate of claim 27, in which the coating further comprises about 1 to about 5 parts by weight, based on the weight of the coating composition, of a nonionic or cationic surfactant.

32. The ink jet printable, saturated hydroentangled fibrous web of claim 31, in which the surfactant is a nonionic surfactant.

33. The ink jet printable, saturated hydroentangled fibrous material of claim 27, in which the coating is overlaying the first surface of the first layer.

* * * * *